United States Patent
Sabard et al.

(10) Patent No.: US 11,396,600 B2
(45) Date of Patent: Jul. 26, 2022

(54) RIGID AND DUCTILE POLYAMIDE-BASED TRANSPARENT COMPOSITION AND USE THEREOF

(71) Applicant: Arkema France, Colombes (FR)

(72) Inventors: Mathieu Sabard, Serquigny (FR); Benoit Brule, Beaumont-le-Roger (FR); Benjamin Saillard, Bernay (FR); Regis Cipriani, Tournedos Bois Hubert (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 16/628,796

(22) PCT Filed: Jul. 6, 2018

(86) PCT No.: PCT/FR2018/051695
§ 371 (c)(1),
(2) Date: Jan. 6, 2020

(87) PCT Pub. No.: WO2019/008288
PCT Pub. Date: Jan. 10, 2019

(65) Prior Publication Data
US 2020/0199360 A1    Jun. 25, 2020

(30) Foreign Application Priority Data
Jul. 7, 2017  (FR) .................................... 17.56429

(51) Int. Cl.
*C08L 77/02*    (2006.01)
*B29C 45/00*    (2006.01)
*B29K 77/00*    (2006.01)
*B29L 31/48*    (2006.01)
*B29L 31/50*    (2006.01)

(52) U.S. Cl.
CPC .......... *C08L 77/02* (2013.01); *B29C 45/0001* (2013.01); *B29K 2077/00* (2013.01); *B29K 2995/0026* (2013.01); *B29L 2031/4835* (2013.01); *B29L 2031/501* (2013.01); *C08L 2201/10* (2013.01); *C08L 2205/025* (2013.01)

(58) Field of Classification Search
CPC ..................... C08L 77/00–10; C08L 2205/025
See application file for complete search history.

(56) References Cited

U.S. PATENT DOCUMENTS

| | | |
|---|---|---|
| 7,014,919 B2 | 3/2006 | Montanari et al. |
| 9,856,350 B2 | 1/2018 | Saillard et al. |
| 10,358,555 B2 | 7/2019 | Fernagut et al. |
| 2002/0173596 A1 | 11/2002 | Montanari et al. |
| 2002/0179888 A1 | 12/2002 | Montanari et al. |
| 2009/0318630 A1 | 12/2009 | Montanari et al. |
| 2012/0014281 A1 | 6/2012 | Buhler et al. |
| 2015/0225505 A1 | 8/2015 | Blondel et al. |

*Primary Examiner* — Ana L. Woodward
(74) *Attorney, Agent, or Firm* — Buchanan Ingersoll & Rooney P.C.

(57) ABSTRACT

The invention relates to the use of at least one impact modifier having a refractive index $IR_1$ in a polyamide matrix consisting of a mixture of amorphous polyamide and semicrystalline polyamide, said matrix having a refractive index IR2, the difference in absolute value of $IR_1$-$IR_2$ not exceeding 0.006, to produce a transparent composition having a fatigue strength, under the fatigue test referred to as notched "Ross-Flex", greater than 50 000 at −10° C.

25 Claims, No Drawings

RIGID AND DUCTILE POLYAMIDE-BASED TRANSPARENT COMPOSITION AND USE THEREOF

This application claims benefit, under U.S.C. § 119 or § 365 of PCT Application Number PCT/FR2018/051695, filed Jul. 6, 2018, and French Patent Applications Number FR 17.56429, filed Jul. 7, 2017, these documents being incorporated herein by reference.

The present invention relates to compositions with impact-modified and transparent polyamide thermoplastic matrices comprising at least one impact modifier whose difference in absolute value of refractive index $RI_1$ from that of the polyamide matrix $RI_2$ is less than or equal to 0.006. It also relates to its use for extrusion, injection or thermoforming, particularly for the production of articles obtained by extrusion, injection, particularly for the production of sports shoes, in particular ski boots or running shoes, or compression molding.

The invention also relates to a production method for said sports articles and the articles obtained by said method.

Manufacturers of sports articles are faced with several challenges.

The articles must become lighter and lighter to reduce the energy expended to a minimum when they are used.

They must also allow the athlete to obtain the necessary sensations for controlling movements and rapidly transmitting muscle pulses.

The rigidity of a part is directly related to the elastic modulus of the constituent material of this part and to the cube of the thickness of the walls.

A material with a high modulus can reduce the thicknesses of the parts and therefore improve greatly on their weight while retaining the necessary rigidity for a good elastic springback indispensable for the athlete.

In many sports articles, good impact resistance must also be guaranteed (impact when cold on a ski boot, for example) and also good resistance to repeated stresses (folding of the sole of a soccer cleat, shoulder pads, elbow pad or knee pads or shin guard, for example).

International application WO 2015/150662 describes mixtures of polyamide and PEBA wherein the PEBA is used as an impact modifier, in particular a mixture of PA11 and a PEBA PA 11/PTMG 1000 (50/50), having a compromise of rigidity, impact and flex-fatigue resistance and having optimized fluidity for the injection of components of sports articles (soles, ski boot shells, rigid shoes with cleats, etc.).

It is specified in this application that the addition of impact modifiers such as polyolefins, in particular grafted polyolefins, particularly grafted by maleic anhydride, improves the impact level of the polyamides but in parallel very significantly increases the viscosity when melted, which makes the product difficult to inject, especially to make thin parts.

The articles, in particular ski boots, must also have thermoforming properties so that the boot, particularly the end of the boot, can perfectly adapt to the foot.

They must also have good fatigue-resistance properties (Ross Flex).

International application WO 2014/037647 describes a transparent composition comprising a copolyamide having the following general formula A/X-Y, the unit X representing an alicyclic diamine unit, said composition being used for the production of a transparent molded article, such as a shoe sole or a shoe-sole element, particularly of a sport shoe.

International application WO 09/153534 describes in particular a composition comprising an amorphous polyamide, a semi-crystalline polyamide and an elastomer for the production of miscellaneous objects such as goggle frames, lenses or goggle lenses, electric, electronic or automotive equipment, surgical material, packaging or sports articles.

Application US 2011105697 describes a composition for transparent molding comprising an amorphous polyamide, a semi-crystalline polyamide and an elastomer in the proportion from 0 to 10% for the production of transparent articles for the production of sports articles.

Patent EP 1227131 describes a transparent composition comprising an amorphous polyamide, a semi-crystalline polyamide and a flexible modifier for the decoration of the tops of skis.

However, none of these compositions can deliver a compromise between ambient-temperature rigidity, low-temperature ductility, fatigue resistance and transparency.

The subject of the present invention is therefore to propose compositions remedying the various drawbacks of the prior art above and to obtain a compromise between ambient-temperature rigidity, low-temperature ductility, fatigue resistance while having transparency properties and good behavior during use, in particular behavior upon injection.

Another subject of the invention relates to the use of said transparent composition for the extrusion, injection or thermoforming, particularly for the production of articles obtained by extrusion, injection, particularly for the production of sports shoes, in particular ski boots or running shoes, or compression molding.

A further subject of the invention relates to a production method for said sports articles and the articles obtained by said method.

The present invention therefore relates to the use of at least one impact modifier having a refractive index $RI_1$ in a polyamide matrix constituted of a mixture of amorphous polyamide and semi-crystalline polyamide, said matrix having a refractive index $RI_2$, the difference in absolute value $RI_1$-$RI_2$ being less than or equal to 0.006, for the constitution of a transparent composition having a resistance in the notched Ross Flex fatigue test greater than 50,000 at −10° C.

In other words, the present invention therefore relates to the use of a composition comprising at least one impact modifier having a refractive index $RI_1$ in a polyamide matrix constituted of a mixture of amorphous polyamide and semi-crystalline polyamide, said matrix having a refractive index $RI_2$, the difference in absolute value $RI_1$-$RI_2$ being less than or equal to 0.006, for the constitution of a transparent composition having a resistance in the notched Ross Flex fatigue test greater than 50,000 at −10° C.

The Applicant has thereby discovered in a surprising manner that the use of an impact modifier with a polyamide matrix whose refractive index difference in absolute value does not exceed 0.006 allowed the constitution of a transparent composition having a compromise of rigidity, impact and flex-fatigue resistance, in particular for extrusion, for the injection of sports articles and also having thermoforming properties.

The term "transparent," as used, means that the composition has transparency such that the transmittance at 560 nm on a plate 2 mm thick is greater than or equal to 75% determined according to standard ISO 13468-2:2006.

The refractive index $RI_1$ is measured with an Abbe refractometer according to standard ISO 489.

The refractive index $RI_2$ is calculated from the refractive indexes of each polyamide forming the matrix according to the following formula:

(% of semi-crystalline polyamide×RI of semi-crystalline polyamide+% of amorphous polyamide× RI of amorphous polyamide), and said refractive indexes of each polyamide forming the matrix (RI of the semi-crystalline polyamide and RI of the amorphous polyamide) having themselves been measured with an Abbe refractometer according to standard ISO 489.

The notched Ross Flex fatigue test is conducted in accordance with standard ASTM D1052 09(2014) (the difference is that the sample is notched and not pierced and that the fold angle is 60°). Parts 2 mm thick, 150 mm long and 20 mm wide were made from the compositions of the invention ($I_n$) or comparison compositions ($C_n$). These parts were notched with a V (1×1 mm wide and deep, with a notch base radius of 0.25 mm), then conditioned for 7 days at 70° C. and 62% relative humidity. The number of cycles is 100/min Advantageously, the resistance in the notched Ross Flex fatigue test is greater than 100,000 at 23° C.

Advantageously, said composition has no polyether block amide (PEBA). In this embodiment, PEBA are therefore excluded from impact modifiers.

An amorphous polyamide, in the sense of the invention, denotes a transparent amorphous polyamide having only a glass transition temperature (not a melting temperature (Tm)), or a polyamide that has very little crystallinity having a glass transition temperature and a melting point such that the crystallization enthalpy during the cooling step at a rate of 20 K/min in differential scanning calorimetry, DSC, measured according to standard ISO 11357-3:2013 is less than 30 J/g, in particular less than 20 J/g, preferably less than 15 J/g. The glass transition temperature (Tg) measured by DSC at a heating rate of 20 K/min according to standard ISO 11357-1:2009 and ISO 11357-2:2013 for these polyamides is greater than 75° C.

A semi-crystalline copolyamide, in the sense of the invention, denotes a copolyamide that has a melting temperature (Tm) by DSC according to ISO standard 11357-3:2013, and a crystallization enthalpy during the cooling step at a rate of 20 K/min by DSC measured according to ISO standard 11357-3 of 2013 greater than 30 J/g, preferably greater than 40 J/g.

Advantageously, the present invention relates to the use of a composition comprising at least one impact modifier in a polyamide matrix constituted of a mixture of amorphous polyamide and semi-crystalline polyamide, defined above, wherein said mixture comprises, by weight, the total being equal to 100%:
  55 to 75% by weight, preferably from 60 to 72% of at least one semi-crystalline polyamide whose mean number of carbon atoms relative to the nitrogen atom is greater than 9, said semi-crystalline polyamide having formula A/Z wherein,
    A is a repeating aliphatic unit chosen from a unit obtained from the polycondensation of at least one amino acid and a unit obtained from the polycondensation of at least one lactam or a unit X-Y obtained from the polycondensation:
    of at least one diamine, said diamine being selected from a linear or branched aliphatic diamine, a cycloaliphatic diamine and an aromatic diamine or a mixture thereof, and
    at least one dicarboxylic acid, said diacid being chosen from:
  an aliphatic diacid, a cycloaliphatic diacid and an aromatic diacid,
  said diamine and said diacid comprising from 4 to 36 carbon atoms, advantageously from 6 to 18 carbon atoms, and
    Z represents a repeating aliphatic unit as defined for A but different than A and is included from 0 to 20% relative to the sum A+Z;
  25 to 45% by weight, preferably from 28 to 40% of an amorphous polyamide, said mixture optionally comprising a polyamide oligomer.

"Polyamide oligomer" must be understood as an oligomer with number-average molecular weight less than that of the semi-crystalline polyamide, particularly said oligomer has a number-average molecular weight comprised from 1000 to 15,000 g/mole, particularly from 1000 to 10,000 g/mole, from 1000 to 5000 g/mole.

Advantageously, the proportion by weight of oligomer relative to the total weight of the composition is included from 0 to 10%, in particular from 3 to 7%.

Advantageously, when the oligomer is present, it is substituted for the semi-crystalline polyamide.

The oligomer can be chosen from aliphatic, linear or branched, polyamide oligomers, cycloaliphatic polyamide oligomers, semi-aromatic polyamide oligomers, aromatic polyamide oligomers, aliphatic, linear or branched, cycloaliphatic, semi-aromatic and aromatic polyamides having the same definition as above.

The oligomer consequently comes from the condensation:
  of at least one lactam, or
  of at least one amino acid, or
  of at least one diamine with at least one dicarboxylic acid, or
a mixture thereof.

The oligomer cannot therefore correspond to the condensation of a diamine with a lactam or an amino acid.

The oligomer can also be a copolyamide oligomer or a mixture of polyamide and copolyamide oligomers. For example, the oligomer is monofunctional $NH_2$, monofunctional $CO_2H$ or difunctional $CO_2H$ or $NH_2$.

The prepolymer can therefore be mono or difunctional, acid or amine, i.e. it has a single terminal amine or acid function, when it is monofunctional (in this case the other ending is non-functional, in particular $CH_3$), or two terminal amine functions or two terminal acid functions, when it is difunctional.

Advantageously, the oligomer is an aliphatic oligomer, particularly it is constituted of PA11.

Advantageously, the oligomer is monofunctional, preferably $NH_2$ or $CO_2H$, preferably mono $NH_2$.

It can also be non-functional at both endings, in particular $diCH_3$.

Monofunctional $NH_2$ oligomers can be produced by reacting an alkyl (linear or branched) or aryl monocarboxylic acid after the condensation of a lactam or amino acid or diamine with a dicarboxylic acid.

$diNH_2$ oligomers can be produced by reacting a diamine after the condensation of a lactam or amino acid or diamine with a dicarboxylic acid.

Monofunctional $CO_2H$ oligomers can be produced by reacting an alkyl (linear or branched) or aryl monocarboxylic acid after the condensation of a lactam or amino acid or diamine with a dicarboxylic acid.

$diCO_2H$ oligomer can be produced by reacting a dicarboxylic acid after the condensation of a lactam or amino acid or diamine with a dicarboxylic acid.

Non-functional $diCH_3$ oligomers can be produced by reacting the amine ends of the oligomer with an alkyl monocarboxylic acid and the acid endings with an alkyl amine.

The Mn can be determined by calculation from the level of terminal functions determined by potentiometric titration in solution and the functionality of said oligomers.

The masses Mn can also be determined by steric exclusion chromatography or by NMR.

Advantageously, said mixture comprises from 60 to 70% of at least one semi-crystalline polyamide as defined above and from 30 to 40% of an amorphous polyamide as defined above.

In the entire description, all the percentages are indicated by weight.

In the entire description, the limits of the ranges of values presented are included.

The term "polyamide" used in the present description covers both homopolyamides and copolyamides.

Advantageously,

Semi-Crystalline Copolyamide:

Whether Z is present or not, the polyamide having formula A/Z must be semi-crystalline as defined above.

For constituent A:

The mean number of carbon atoms relative to the nitrogen atom is greater than 9.

Advantageously, it is greater than 10.

In the case of a PA-X-Y homopolyamide, the number of carbon atoms per nitrogen atom is the mean of unit X and unit Y.

In the case of a copolyamide, the number of carbons per nitrogen is calculated according to same principle. The molar ratios of the various amide units are used for the calculation.

A: Repeating Aliphatic Unit

In a first variant of the invention, the repeating aliphatic unit A is obtained from the polycondensation of an aminocarboxylic acid.

Advantageously, said aminocarboxylic acid comprises from 9 to 12 carbon atoms. It can accordingly be chosen from 9-aminononanoic acid (noted 9), 10-aminodecanoic acid (noted 10), 11-aminoundecanoic acid (noted 11) and 12-aminododecanoic acid (noted 12); advantageously the aminocarboxylic acid is 11-aminoundecanoic acid.

In a second variant of the invention, the repeating aliphatic unit A is obtained from the polycondensation of a lactam.

Advantageously the lactam comprises from 9 to 12 carbon atoms. It can accordingly be chosen from decanolactam (noted 10), undecanolactam (noted 11) and laurolactam or lauryllactam (noted 12); advantageously the lactam is lauryllactam.

In a more particularly preferred manner, the repeating unit A is obtained from a single aminocarboxylic acid or from a single lactam.

However, it can absolutely be envisaged to use, for the production of this same unit A, a mixture of two or more aminocarboxylic acids, a mixture of two or more lactams, but also a mixture of one, two or more aminocarboxylic acids with one, two or more lactams.

A: Repeating Unit X-Y

The repeating unit X-Y is a unit obtained from the polycondensation of at least one linear or branched aliphatic diamine or a mixture of two or more of these, or of at least one cycloaliphatic diamine or of at least one aromatic diamine, or of a mixture thereof, and of at least one dicarboxylic acid chosen from an aliphatic diacid, a cycloaliphatic diacid and an aromatic diacid.

The molar proportions of diamine and dicarboxylic acid are preferably stoichiometric.

The diamine and the dicarboxylic acid each comprise from 4 to 36 carbon atoms and, advantageously, from 6 to 18 carbon atoms.

The aliphatic diamine used to produce this repeating unit X-Y is an aliphatic diamine that has a linear main chain comprising at least 4 carbon atoms.

This linear main chain can, if necessary, include one or more methyl and/or ethyl substituents; in the latter configuration, this is called a "branched aliphatic diamine." In the case where the main chain does not include any substituent, the aliphatic diamine is called a "linear aliphatic diamine."

Whether or not it includes methyl and/or ethyl substituents on the main chain, the aliphatic diamine used to produce this repeating unit X-Y comprises from 4 to 36 carbon atoms, advantageously from 4 to 18 carbon atoms, advantageously from 6 to 18 carbon atoms, advantageously from 6 to 14 carbon atoms.

When this diamine is a linear aliphatic diamine, it then meets the formula $H_2N-(CH_2)_x-NH_2$ and can be chosen for example from butanediamine, pentanediamine, hexanediamine, heptanediamine, octanediamine, nonane-diamine, decanediamine, undecanediamine, dodecanediamine, tridecanediamine, tetradecanediamine, hexadecanediamine, octadecanediamine and octadecenediamine. The linear aliphatic diamines that have just been cited can all be biosourced in the sense of standard ASTM D6866.

When this diamine is a branched aliphatic diamine, it can in particular be 2-methyl-pentanediamine, 2-methyl-1,8-octanediamine or trimethylene (2,2,4- or 2,4,4-) hexanediamine.

When the diamine is a cycloaliphatic diamine, it is chosen for example from bis(3,5-dialkyl-4-aminocyclohexyl)-methane, bis(3,5-dialkyl-4-aminocyclohexyl)ethane, bis(3,5-dialkyl-4-aminocyclohexyl)-propane, bis(3,5-dialkyl-4-aminocyclo-hexyl)-butane, bis-(3-methyl-4-aminocyclohexyl)-methane or 3'-dimethyl-4,4'-diaminodicyclohexyl-methane commonly called "BMACM" or "MACM" (and noted B below), p-bis(aminocyclohexyl)-methane commonly called "PACM" (and noted P below), isopropylidenedi(cyclohexylamine) commonly called "PACP", isophorone-diamine (noted IPD below) and 2,6-bis(amino methyl)norbornane commonly called "BAMN", 1,3-bis(aminomethyl)cyclohexyl (1,3 BAC), 1,4-bis(aminomethyl)cyclohexyl (1,4 BAC) and a mixture thereof.

A non-exhaustive list of these cycloaliphatic diamines is given in the publication "Cycloaliphatic Amines" (Encyclopaedia of Chemical Technology, Kirk-Othmer, 4th Edition (1992), pp. 386-405).

The aromatic diamine can be chosen from 1,3-xylylene diamine and 1,4-xylylene diamine.

The dicarboxylic acid can be chosen from the linear or branched aliphatic dicarboxylic acids, cycloaliphatic dicarboxylic acids and aromatic dicarboxylic acids.

The dicarboxylic acid can be chosen from the linear or branched aliphatic dicarboxylic acids.

When the dicarboxylic acid is aliphatic and linear, it can be chosen from succinic acid (4), pentanedioic acid (5), adipic acid (6), heptanedioic acid (7), octanedioic acid (8), azelaic acid (9), sebacic acid (10), undecanedioic acid (11), dodecanedioic acid (12), brassylic acid (13), tetradecanedioic acid (14), hexadecanedioic acid (16), octadecanoic acid (18), octadecenedioic acid (18), eicosanedioic acid (20), docosanedioic acid (22) and fatty acid dimers containing 36 carbons. The fatty acid dimers mentioned above are dimerized fatty acids obtained by oligomerization or polymerization of monobasic unsaturated long-chain hydrocarbon fatty acids (such as linoleic acid and oleic acid), as described in particular in document EP 0,471,566.

When the diacid is cycloaliphatic, it can include the following carbon backbones: norbomylmethane, cyclohexane, cyclohexylmethane, dicyclohexylmethane, dicyclohexylpropane, di(methylcyclohexyl) or di(methylcyclohexyl) propane.

When the dicarboxylic acid is aromatic, it can be chosen from terephthalic acid (denoted T), isophthalic acid (denoted I) and a naphthalenic acid.

Advantageously, said semi-crystalline polyamide has formula A/Z wherein A is a repeating unit obtained from the polycondensation of at least one unit XY obtained from the polycondensation of at least one linear or branched aliphatic diamine and at least one aliphatic dicarboxylic acid.

Advantageously, said semi-crystalline polyamide has formula A/Z wherein A is a repeating unit obtained from the polycondensation of a unit XY obtained from the polycondensation of a linear or branched aliphatic diamine and an aliphatic dicarboxylic acid.

Z: Other Repeating Aliphatic Unit

Z denotes another repeating unit and may correspond to a repeating aliphatic unit or a unit X-Y as defined above for A, provided that it is different than A.

The proportion of Z present is from 0 to 20% by weight relative to the sum A+Z, particularly from 0.1 to 20%.

Amorphous Polyamide:

The amorphous polyamide can be a homopolyamide or a copolyamide. The amorphous polyamides are chosen from aliphatic, cycloaliphatic and aromatic polyamides or a mixture thereof. In particular, the amorphous polyamide (or when the composition comprises a mixture of amorphous polyamides, at least one of the amorphous polyamides, or even each of the amorphous polyamides) comprises at least one unit meeting the formula Ca diamine-Cb diacid.

The repeating unit Ca diamine-Cb diacid is a unit obtained from the polycondensation of at least one linear or branched aliphatic diamine or at least one cycloaliphatic diamine or of at least one aromatic diamine or of a mixture of two or more thereof and of at least one aliphatic dicarboxylic acid or of at least one cycloaliphatic dicarboxylic acid or of at least one aromatic dicarboxylic acid.

The molar proportions of diamine and dicarboxylic acid are preferably stoichiometric.

The diamine and the dicarboxylic acid each comprise from 4 to 36 carbon atoms and, advantageously, from 6 to 18 carbon atoms.

The aliphatic diamine used to produce this Ca diamine-Cb diacid repeating unit is as defined above for the diamine of constituent A.

The cycloaliphatic diamine can be chosen for example from bis(3,5-dialkyl-4-aminocyclohexyl)-methane, bis(3,5-dialkyl-4-aminocyclohexyl)ethane, bis(3,5-dialkyl-4-aminocyclohexyl)-propane, bis(3,5-dialkyl-4-aminocyclohexyl)-butane, bis-(3-methyl-4-aminocyclohexyl)-methane or 3'-dimethyl-4,4'-diamino-dicyclohexyl-methane commonly called "BMACM" or "MACM" (and noted B below), p-bis(aminocyclohexyl)-methane commonly called "PACM" (and noted P below), isopropylidenedi(cyclohexylamine) commonly called "PACP", isophorone-diamine (noted IPD below) and 2,6-bis(amino methyl)norbornane commonly called "BAMN."

The aromatic diamine can be chosen from 1,3-xylylene diamine and 1,4-xylylene diamine.

The dicarboxylic acid can be chosen from the linear or branched aliphatic dicarboxylic acids, cycloaliphatic dicarboxylic acids and aromatic dicarboxylic acids.

When the dicarboxylic acid is aliphatic and linear, it is as defined above for diacid Y.

When the diacid is cycloaliphatic, it can include the following carbon backbones: norbornylmethane, cyclohexane, cyclohexylmethane, dicyclohexylmethane, dicyclohexylpropane, di(methylcyclohexyl) or di(methylcyclohexyl) propane.

When the dicarboxylic acid is aromatic, it can be chosen from terephthalic acid (denoted T), isophthalic acid (denoted I) and a naphthalenic acid.

In an embodiment, said mixture comprises from 60 to 70% of semi-crystalline polyamide and from 30 to 40% of amorphous polyamide.

Regarding the Impact Modifier

The impact modifier can be any impact modifier provided that the difference in absolute value of its refractive index from that of the polyamide matrix does not exceed 0.006.

The impact modifier is advantageously constituted of a polymer having a flexural modulus less than 100 MPa measured according to the ISO 178 standard and Tg below 0° C. (measured according to the standard 11357-2 near the inflection point of the DSC thermogram), in particular a polyolefin.

In one embodiment, PEBA are excluded from the definition of impact modifiers.

The polyolefin of the impact modifier can be functionalized or non-functionalized or be a mixture of at least one functionalized polyolefin and/or least one non-functionalized polyolefin. To simplify, the polyolefin is denoted (B) and functionalized polyolefins (B1) and non-functionalized polyolefins (B2) are described below.

A non-functionalized polyolefin (B2) is classically a homopolymer or copolymer of alpha-olefins or diolefins, such as for example, ethylene, propylene, 1-butene, 1-octene, butadiene. As examples, mention may be made of:

the homopolymers and copolymers of polyethylene, particularly LDPE, HDPE, LLDPE (linear low-density polyethylene), VLDPE (very low density polyethylene) and metallocene polyethylene.

homopolymers or copolymers of propylene.

ethylene/alpha-olefin copolymers such as ethylene/propylene, EPR (abbreviation for ethylene-propylene-rubber) and ethylene/propylene/diene (EPDM).

styrene/ethylene-butene/styrene (SEBS), styrene/butadiene/styrene (SBS), styrene/isoprene/styrene (SIS), styrene/ethylene-propylene/styrene (SEPS) block copolymers.

copolymers of ethylene with at least one product chosen from the salts or esters of unsaturated carboxylic acids such as alkyl (meth)acrylate (for example methyl acrylate), or the vinyl esters of saturated carboxylic acids such as vinyl acetate (EVA), where the proportion of comonomer can reach 40% by weight.

The functionalized polyolefin (B1) can be a polymer of alpha-olefins having reactive units (functionalities); such reactive units are acid, anhydride, or epoxy functions. As an example, mention may be made of the preceding polyolefins (B2) grafted or co- or ter-polymerized by unsaturated epoxides such as glycidyl (meth)acrylate, or by carboxylic acids or the corresponding salts or esters such as (meth)acrylic acid (which can be completely or partially neutralized by metals such as Zn, etc.) or by carboxylic acid anhydrides such as maleic anhydride. A functionalized polyolefin is for example a PE/EPR mixture, whose ratio by weight can vary widely, for example between 40/60 and 90/10, said mixture being co-grafted with an anhydride, in particular maleic anhydride, according to a graft rate for example of 0.01 to 5% by weight.

The functionalized polyolefin (B1) can be chosen from the following (co)polymers, grafted with maleic anhydride or glycidyl methacrylate, wherein the graft rate is for example from 0.01 to 5% by weight:

- of PE, of PP, of copolymers of ethylene with propylene, butene, hexene, or octene containing for example from 35 to 80% by weight of ethylene;
- ethylene/alpha-olefin copolymers such as ethylene/propylene, EPR (abbreviation for ethylene-propylene-rubber) and ethylene/propylene/diene (EPDM).
- styrene/ethylene-butene/styrene (SEBS), styrene/butadiene/styrene (SBS), styrene/isoprene/styrene (SIS), styrene/ethylene-propylene/styrene (SEPS) block copolymers.
- ethylene and vinyl acetate copolymers (EVA), containing up to 40% by weight of vinyl acetate;
- ethylene and alkyl (meth)acrylate copolymers, containing up to 40% by weight of alkyl (meth)acrylate;
- ethylene and vinyl acetate (EVA) and alkyl (meth)acrylate copolymers, containing up to 40% by weight of comonomers.

The functionalized polyolefin (B1) can also be chosen from ethylene/propylene copolymers with a majority of propylene grafted by maleic anhydride then condensed with a mono-amine polyamide (or a polyamide oligomer) (products described in EP-A-0,342,066).

The functionalized polyolefin (B1) can also be a co- or terpolymer of at least the following units: (1) ethylene, (2) alkyl (meth)acrylate or vinyl ester of saturated carboxylic acid and (3) anhydride such as maleic anhydride or (meth) acrylic acid or epoxy such as glycidyl (meth)acrylate.

As an example of functionalized polyolefins of the latter type, mention may be made of the following copolymers, where ethylene represents preferably at least 60% by weight and where the termonomer (the function) represents for example from 0.1 to 10% by weight of the copolymer:

- ethylene/alkyl (meth)acrylate/(meth)acrylic acid or maleic anhydride or glycidyl methacrylate copolymers;
- ethylene/vinyl acetate/maleic anhydride or glycidyl methacrylate copolymers;
- ethylene/vinyl acetate or alkyl (meth)acrylate/(meth) acrylic acid or maleic anhydride or glycidyl methacrylate copolymers.

In the preceding copolymers, (meth)acrylic acid can be salified with Zn or Li.

The term "alkyl (meth)acrylate" in (B1) or (B2) denotes C1 to C8 alkyl methacrylates and acrylates, and can be chosen from methyl acrylate, ethyl acrylate, n-butyl acrylate, isobutyl acrylate, 2-ethyl-hexyl acrylate, cyclohexyl acrylate, methyl methacrylate and ethyl methacrylate.

Moreover, the previously cited polyolefins (B1) may also be crosslinked by any appropriate method or agent (diepoxy, diacid, peroxide, etc.); the term functionalized polyolefin also comprises mixtures of the previously cited polyolefins with a difunctional reagent such as a diacid, dianhydride, diepoxy, etc. that can react with these or mixtures of at least two functionalized polyolefins that can react together.

The copolymers mentioned above, (B1) and (B2), may be copolymerized in a statistical or sequenced way and have a linear or branched structure.

The molecular weight, MFI, and density of these polyolefins can also vary widely, which the person skilled in the art will know. MFI, abbreviation for melt flow index, is a measure of fluidity when melted. It is measured according to standard ASTM 1238.

Advantageously the non-functionalized polyolefins (B2) are chosen from homopolymers or copolymers of polypropylene and any ethylene homopolymer or ethylene copolymer and a higher alpha-olefin comonomer such as butene, hexene, octene or 4-methyl-1-pentene. Mention may be made for example of PP, high-density PE, medium-density PE, linear low-density PE, low-density PE, very low-density PE. These polyethylenes are known by the person skilled in the art as being products from a "free-radical" method, from a "Ziegler" catalysis method, or, more recently, from "metallocene" catalysis.

Advantageously the functionalized polyolefins (B1) are chosen from any polymer comprising alpha-olefin units and units carrying polar reactive functions like epoxy, carboxylic acid or carboxylic acid anhydride functions. As examples of such polymers, mention may be made of terpolymers of ethylene, alkyl acrylate and maleic anhydride or glycidyl methacrylate like Lotader® from the Applicant or polyolefins grafted by maleic anhydride like Orevac® from the Applicant and terpolymers of ethylene, alkyl acrylate and (meth)acrylic acid. Mention may also be made of homopolymers or copolymers of polypropylene grafted by a carboxylic acid anhydride then condensed with polyamides or monoamine polyamide oligomers.

Advantageously, said transparent composition is devoid of core-shell particles or core-shell polymers.

Core-shell particle must be understood as a particle whose first layer forms the core and the second or all following layers form the respective shells.

The core-shell particle can be obtained by a method with several steps comprising at least two steps. Such a method is described for example in documents US2009/0149600 or EP0,722,961.

In an embodiment, the present invention relates to the use of at least one impact modifier in a polyamide matrix constituted of a mixture of amorphous polyamide and semi-crystalline polyamide, defined above, wherein said impact modifier represents from 5 to 30%, in particular from 10 to 30%, particularly from 15 to 27% of the total weight of the transparent composition.

In one embodiment, said impact modifier represents from 17 to 27%, particularly from 20 to 27% of the total weight of the transparent composition.

In another embodiment, the present invention relates to the use of at least one impact modifier in a polyamide matrix constituted of a mixture of amorphous polyamide and semi-crystalline polyamide, defined above, wherein said transparent composition comprises from 0 to 5%, particularly from 0.001 to 5%, of at least one additive chosen from stabilizers, colorants, plasticizers, whitening agents, or a mixture thereof.

Regarding the Additive:

The additive is chosen from stabilizers, colorants, plasticizers, whitening agents or a mixture thereof.

As an example, the stabilizer can be a UV stabilizer, an organic stabilizer or more generally a combination of organic stabilizers, such as a phenol antioxidant (for example of the type Irganox® 245 or 1098 or 1010 by Ciba-BASF), a phosphite antioxidant (for example Irgafos® 126 and Irgafos® 168 by Ciba-BASF) and optionally other stabilizers like a HALS, which means hindered amine light stabilizer (for example Tinuvin® 770 by Ciba-BASF), an anti-UV (for example Tinuvin® 312 by Ciba), a phosphorus-based stabilizer. Amine antioxidants such as Crompton's Naugard® 445 or polyfunctional stabilizers such as Clariant's Nylostab® S-EED can also be used.

This stabilizer may also be a mineral stabilizer, such as a copper-based stabilizer. As an example of such mineral stabilizers, mention may be made of halides and copper acetates. Secondarily, other metals such as silver can optionally be considered, but these are known to be less effective. These compounds containing copper are typically associated with alkali metal halides, particularly potassium.

As an example, the plasticizers are chosen from benzene sulfonamide derivatives, such as n-butyl benzene sulfonamide (BBSA); ethyl toluene sulfonamide or N-cyclohexyl toluene sulfonamide; hydroxybenzoic acid esters, such as 2-ethylhexyl parahydroxybenzoate and 2-decylhexyl parahydroxybenzoate; esters or ethers of tetrahydrofurfuryl alcohol, like oligoethyleneoxytetrahydrofurfuryl alcohol; and esters of citric acid or of hydroxy-malonic acid, such as oligoethyleneoxy malonate.

Using a mixture of plasticizers would not be outside the scope of the invention.

As an example, the whitening agent is Uvitex OB by BASF.

In an embodiment, said transparent composition comprises from 0 to 10% by weight of at least one fluidifying agent.

Fluidifying agent must be understood as a processing aid such as Bruggolen® TP-P1507 and calcium stearate that aids the process or demolding.

Advantageously, the present invention relates to the use of a composition comprising at least one impact modifier in a polyamide matrix constituted of a mixture of amorphous polyamide and semi-crystalline polyamide, defined above, wherein said transparent composition comprises, by weight, the total being equal to 100%:
from 65 to 95% of said polyamide mixture, preferably from 73 to 85% by weight,
from 5 to 30% of at least one impact modifier, preferably from 15 to 27% by weight,
from 0 to 5%, particularly 0.001 to 5% of at least one additive,
from 0 to 10% by weight of at least one fluidifying agent,
said amorphous polyamide being in sufficient proportion for the composition to be sufficiently rubber at low temperature, and rigid, and has in particular impact resistance with a $T_{RG}<0°$ C. as determined according to standard ISO 179 1eA.

Advantageously, said composition has a flexural modulus greater than 850 MPa, in particular greater than 870, particularly greater than or equal to 900 MPa as determined according to standard ISO 178:2010.

Advantageously, said composition has an impact resistance with a $T_{RG}<0°$ C. as determined according to standard ISO 179 1eA, a flexural modulus greater than 850 MPa, in particular greater than 870, particularly greater than or equal to 900 MPa as determined according to standard ISO 178:2010.

The term "rubber" denotes the capacity of a material to deform plastically without breaking.

Advantageously, the present invention relates to the use of at least one impact modifier in a polyamide matrix constituted of a mixture of amorphous polyamide and semi-crystalline polyamide, defined above, wherein the transparent composition of the invention is a thermoformable composition.

The $T_{RG}$ is the rubber-glass transition temperature that corresponds to the temperature at which a material passes from rubber behavior (partial material breakage) to glass behavior (complete material breakage). The rubber-glass transition can therefore be seen as a temperature range where there is 50% of glass breakage (sample has glass behavior) and 50% of partial breakage (sample has rubber behavior) and a competition between rubber behavior and glass behavior.

The impact strength is obtained with the Charpy impact test conducted according to standard ISO 179 1eA.

Therefore the rubber-glass transition ($T_{RG}$) corresponds to the inflection point of the curve of impact strength as a function of temperature.

In another embodiment, the present invention relates to the use of at least one impact modifier in a polyamide matrix constituted of a mixture of amorphous polyamide and semi-crystalline polyamide, defined above, wherein the transparent composition has a transparency such that the transmittance at 560 nm on a plate 2 mm thick is greater than 75% determined according to standard ISO 13468-2:2006.

Advantageously, said transparent composition has a Haze less than or equal to 25% (in Haze units), measured according to standard ASTM D1003-97.

In one embodiment the present invention relates to the use of at least one impact modifier in a polyamide matrix constituted of a mixture of amorphous polyamide and semi-crystalline polyamide, defined above, wherein the semi-crystalline polyamide is an aliphatic polyamide.

Advantageously, said aliphatic semi-crystalline polyamide is chosen from PA11, PA12, PA1010, PA1012, particularly PA11.

In one embodiment the present invention relates to the use of at least one impact modifier in a polyamide matrix constituted of a mixture of amorphous polyamide and semi-crystalline polyamide, defined above, wherein the amorphous polyamide is a polyamide having formula $A_1/X_1Y_1$ wherein:
$A_1$ is a repeating aliphatic unit chosen from a unit obtained from the polycondensation of at least one aminocarboxylic acid and a unit obtained from the polycondensation of at least one lactam or a unit obtained from the polycondensation of at least one aliphatic diamine and at least one aliphatic diacid,
$X_1$ is a cycloaliphatic diamine, and
$Y_1$ is a dicarboxylic acid, said diacid being chosen from an aliphatic diacid, a cycloaliphatic diacid and an aromatic diacid,
said diamine and said diacid comprising from 4 to 36 carbon atoms, advantageously from 6 to 18 carbon atoms.
$A_1$ repeating aliphatic unit is as defined above for A.
$X_1$ is as defined above for X being a cycloaliphatic diamine, and $Y_1$ is as defined above for Y being a dicarboxylic acid.

Advantageously, said amorphous polyamide having formula $A_1/X_1Y_1$ used in the transparent composition is chosen from 11/B10, 11/P10, 12/B10, 12/P10, 11/BI/BT, 11/PI/PT, 12/BI/BT, 12/PI/PT, 11/BI, 11/PI, 12/BI, 12/PI, in particular 11/B10 or 11/P10.

Advantageously, the present invention relates to the use of at least one impact modifier in a polyamide matrix constituted of a mixture of amorphous polyamide and semi-crystalline polyamide, defined above, wherein the semi-crystalline polyamide is an aliphatic polyamide and said amorphous polyamide has formula $A_1/X_1Y_1$ wherein A1 has a repeating aliphatic unit chosen from a unit obtained from the polycondensation of an aminocarboxylic acid or a lactam as defined above, $X_1$ is as defined above for X being a cycloaliphatic diamine and $Y_1$ is as defined above for Y being an aliphatic or aromatic dicarboxylic acid, particularly an aliphatic dicarboxylic acid.

In this embodiment, the semi-crystalline polyamide that is an aliphatic polyamide therefore denotes either a semi-crystalline polyamide from the polycondensation of an aminocarboxylic acid or a lactam as defined above, or a unit XY wherein X represents a linear or branched aliphatic diamine, particularly linear and Y represents an aliphatic dicarboxylic acid.

In this embodiment, the impact modifier is particularly a styrene/ethylene-butene/styrene (SEBS) block copolymer.

Advantageously, the present invention relates to the use of at least one impact modifier in a polyamide matrix constituted of a mixture of amorphous polyamide and semi-crystalline polyamide, defined above, wherein said aliphatic semi-crystalline polyamide is PA11 and the amorphous polyamide is 11/B10.

Advantageously, the present invention relates to the use of at least one impact modifier in a polyamide matrix constituted of a mixture of amorphous polyamide and semi-crystalline polyamide, defined above, wherein said aliphatic semi-crystalline polyamide is PA11 and the amorphous polyamide is 11/B10.

In one embodiment the present invention relates to the use of at least one impact modifier in a polyamide matrix constituted of a mixture of amorphous polyamide and semi-crystalline polyamide, defined above, wherein the impact modifier is chosen from styrene/ethylene-butene/styrene (SEBS) block copolymers.

Advantageously, the present invention relates to the use of a at least one impact modifier in a polyamide matrix constituted of a mixture of amorphous polyamide and semi-crystalline polyamide, defined above, wherein the proportion of Z=0.

Advantageously, said semi-crystalline polyamide and/or said amorphous polyamide of said transparent composition is(are) partially or completely biosourced.

According to another aspect, the present invention relates to a transparent composition comprising:
  from 73 to 85% by weight of a polyamide matrix having a refractive index $RI_2$, as defined above,
  from 15 to 27% by weight of at least one impact modifier having a refractive index $RI_1$,
  from 0 to 5%, particularly 0.001 to 5% by weight of at least one additive,
  from 0 to 10% of at least one fluidifying agent,
  the sum of the constituents being equal to 100% and the difference in absolute value $RI_1—RI_2$ being less than or equal to 0.006.

Advantageously, PEBA are excluded from impact modifiers present in said composition defined above.

Advantageously, said polyamide matrix of said transparent composition is a mixture comprising from 55 to 75% by weight, preferably from 60 to 72% of an aliphatic semi-crystalline polyamide and from 25 to 45% by weight, preferably from 28 to 40% of an amorphous polyamide. Advantageously, said mixture comprises from 60 to 70% of at least one semi-crystalline polyamide as defined above and from 30 to 40% of an amorphous polyamide as defined above.

Advantageously, said aliphatic semi-crystalline polyamide of said transparent composition is chosen from PA11, PA12, PA1010, PA1012, particularly PA11.

Advantageously, said amorphous polyamide of said transparent composition is chosen from 11/B10, 12/B10, 11/BI/BT, 11/BI, in particular 11/B10.

Advantageously, the aliphatic semi-crystalline polyamide of said transparent composition is PA11 and the amorphous polyamide is 11/B10.

According to another aspect, the present invention relates to the use of a transparent composition as defined above, for the production of sports articles or eyewear or electric and electronic articles, obtained by extrusion, injection, molding or thermoforming.

In the latter case, the composition refers to that defined for the use of the impact modifier with the polyamide matrix and not only to the composition such as defined above.

According to one embodiment, the use of a transparent composition as defined above is for the production of articles obtained by injection, particularly for a sports article, in particular a ski boot or a ski boot part or a rigid shoe with cleats or a part of rigid shoes with cleats, such as a soccer, rugby or football cleat, hockey footwear or a part of hockey footwear, or a running shoe, a golf ball or a part of a golf ball, or a lacrosse stick or also hockey article such as a helmet or sport articles for protecting the head, shoulders, elbows, hands, knees, back or shins, such as helmets, gloves, shoulder pads, elbow pads, knee pads or shin guards.

According to an embodiment, the use of a transparent composition as defined above is for the production of articles obtained by injection such as the optical articles, particularly goggles or a mask, in particular goggles or a mask used in the practice of a sport such as protective goggles or a ski mask.

According to one embodiment, the use of a transparent composition as defined above for the production of articles obtained by extrusion such as films.

According to another aspect, the present invention relates to the use of a transparent composition as defined above, for thermoforming an article, in particular a part of a ski boot or roller boot or hockey footwear, in particular a ski boot, or goggles or a mask, in particular goggles or a mask for sport, particularly protective goggles or a ski mask.

According to another aspect, the present invention relates to a method for preparing a transparent composition as defined above, comprising a step of mixing said matrix, said impact modifier, optionally said additive and optionally said fluidifying agent, when melted, particularly in an extruder, at a temperature comprised between 230 and 330° C., to later produce granules, granules that will be then injected at a temperature comprised between 230 and 330° C., on an injection press to produce the desired articles.

As above, this method refers to the composition defined for the use of the impact modifier with the polyamide matrix and not only to the composition such as defined above.

According to another aspect, the present invention relates to a shaped article, such as a fiber, cloth, film, sheet, rod, tube, injected part, comprising the composition as defined above, which can be made in the form of a dry mixture or after compounding on an extruder.

In the same way, the article refers to the composition defined for the use of the impact modifier with the polyamide matrix and not only to the composition such as defined above.

Advantageously, said article is characterized by the fact that it consists in a sports article, in particular a ski boot or a ski boot part or a rigid shoe with cleats or a part of rigid shoes with cleats, such as a soccer, rugby or football cleat, hockey footwear or a part of hockey footwear, or a running shoe, a golf ball or a part of a golf ball, or a lacrosse stick or also a hockey article such as a helmet or sport articles for protecting the head, shoulders, elbows, hands, knees, back or shins, such as helmets, gloves, shoulder pads, elbow pads, knee pads or shin guards.

Advantageously, said article is characterized by the fact that it consists in optical articles, particularly goggles or a mask, in particular goggles or a mask used in the practice of a sport such as protective goggles or a ski mask.

The invention will now be illustrated by the following examples without being in any way limited to these.

EXAMPLES

The semi-crystalline (PAsc) and amorphous (PAam) polyamides are prepared by polycondensation according to methods known to the person skilled in the art.

base radius of 0.25 mm), the fold angle is 60°, then conditioned for 7 days at 70° C. and 62% relative humidity. The number of cycles is 100/min.

The samples are tested at 23° C. or −10° C.

Through the "Ross Flex" test the number of times after which the part, folded at the height of the notch at 600 and at a temperature of 23° C. or −10° C., breaks. It is considered that the part meets the conditions of this test when the number of cycles is greater than or equal to 50,000.

The Ross Flex results are expressed in numbers of cycles at break.

Signifies not tested

Transmittance is determined according to ISO 13468-2: 2006.

| Ref | % impact modifier (Kraton ® 1901) | 100 × (PAsc/ΣPA) (%) | Transmittance @560 nm, 2 mm (%) | Haze (2 mm) (%) | Flexural modulus (MPa) | $T_{RG}$ (° C.) | Ross Flex Number of cycles at break at 23° C./−10° C. - Notched - | $RI_1$-$RI_2$ |
|---|---|---|---|---|---|---|---|---|
| C1 | 7.5 | 50 | 83 | — | 1300 | 5 | 13,000/5,000 | 0.0045 |
| C2 | 4 | 62 | 85 | — | 1250 | 23 | 7,000/3,000 | 0.0053 |
| C3 | 10 | 50 | 83 | — | 1200 | <0 | 8,000/3,000 | 0.0045 |
| I1 | 10 | 70 | 75 | — | 1140 | <0 | >100,000/>50,000 | 0.0059 |
| C4 | 10 | 78 | 71 | — | 1050 | <0 | >100,000/>50,000 | 0.0065 |
| C5 | 12.5 | 34 | 82 | — | 1200 | <0 | 7,000/4,000 | 0.0034 |
| C6 | 12.5 | 50 | 84 | — | 1150 | <0 | 8,000/3,000 | 0.0045 |
| C8 | 15 | 18 | 83 | — | 1180 | <0 | 5,000/2,000 | 0.0023 |
| C9 | 15 | 50 | 82 | — | 1110 | <0 | 30,000/10,000 | 0.0045 |
| I2 | 15 | 63 | 79 | — | 1000 | <0 | >100,000/>50,000 | 0.0054 |
| C10 | 15 | 82 | 69 | — | 980 | <0 | >100,000/>50,000 | 0.0067 |
| I3 | 17.5 | 63 | 78 | — | 960 | <0 | >100,000/>50,000 | 0.0054 |
| C11 | 20 | 35 | 83 | — | 1110 | <0 | 12,000/2,500 | 0.0034 |
| I4 | 20 | 66 | 77 | — | 940 | <0 | >100,000/>50,000 | 0.0056 |
| C12 | 15 (Peba 40ShD) | 100 | <75 | — | 850 | >0 | >100,000/>50,000 | >0.006 |
| C13 | 12 (Fusabond 493N) | 55 | <75 | — | 1100 | <0 | >100,000/>50,000 | >0.006 |
| C14 | 21 (Fusabond 493N) | 67 | <75 | — | 940 | <0 | >100,000/>50,000 | >0.006 |
| I5 | 20 | 66 | 76 | 22 | 950 | <0 | >100,000/>50,000 | 0.0056 |
| I6 | 21 | 67 | 75 | 20 | 920 | <0 | >100,000/>50,000 | 0.0057 |
| I7 | 25 | 62 | 75 | 17 | 910 | <0 | >100,000/>50,000 | 0.0053 |
| C15 | 0 | 30 | 88 | — | 1300 | >0 | 3,000/1,000 | — |
| C16 | 0 | 70 | 83 | — | 1200 | >0 | 30,000/12000 | — |
| I8 | 21 | 67.5 | 77 | 20 | 960 | <0 | >100,000/>50,000 | 0.0057 |
| I9 | 21 | 67.5 | 75 | 21 | 880 | <0 | >100,000/>50,000 | 0.0057 |
| I10 | 25 | 64 | 75 | 19 | 910 | <0 | >100,000/>50,000 | 0.0055 |
| I11 | 25 | 66 | 75 | 20 | 900 | <0 | >100,000/>50,000 | 0.0056 |
| I12 | 25 | 68 | 75 | 21 | 890 | <0 | >100,000/>50,000 | 0.0058 |
| I13 | 22.5 | 64 | 76 | 18 | 930 | <0 | >100,000/>50,000 | 0.0055 |
| I14 | 22.5 | 66 | 76 | 19 | 930 | <0 | >100,000/>50,000 | 0.0056 |
| I15 | 22.5 | 68 | 75 | 24 | 920 | <0 | >100,000/>50,000 | 0.0058 |

The mixtures were created by a compounding method, using a twin-screw co-rotating extruder 40×D long (D=screw diameter and =18 mm), at a flow rate Q=7 kg/h, a screw rate of 300 rpm, and at a T=270° C.

The flexural modulus is determined according to ISO 178:2010.

The impact strength is obtained with the Charpy impact test conducted according to standard ISO 179 1eA.

Therefore the rubber-glass transition ($T_{RG}$) corresponds to the inflection point of the curve of impact strength as a function of temperature.

The Ross Flex fatigue test is conducted in accordance with standard ASTM D1052 09(2014) with the modifications described above. Parts 2 mm thick, 150 mm long and 20 mm wide were made from the compositions of the invention ($I_n$) or comparison compositions ($C_n$). These parts have been notched V (1×1 mm wide and deep, with notch Haze is measured according to standard ASTM D1003-97.

The shock modifier used is Kraton® FG 1901 (Kraton Polymers International), which is a maleic anhydride-grafted SEBS apart from composition C12 wherein a PEBA (11PTMG1000 (50/50)) with 40 Shore D is used, and compositions C13 and C14 wherein a Fusabond 493N (sold by DuPont), which is a maleic anhydride-modified ethylene copolymer.

The sum of the percentage of impact modifier and mixture of semi-crystalline polyamide with the amorphous polyamide represents 100% in all the examples apart from examples 19 that correspond to I8 plus 2% by weight of Bruggolen® TP-P1507, the total being equal to 100%, and for examples 110-12 wherein there is 6% of oligomer PA11-mono $NH_2$ having Mn=3000 g/mol, the total being equal to 100% and examples 13-115, wherein there is 4.5% of oligomer PA11-mono NH$_2$ having Mn=3000 g/mol, the total being equal to 100%.

The mixture of polyamides in the compositions of the invention is constituted of PAsc:PA11 and PAam:PA11/B10

$$\Sigma PA=\% \text{ PAsc}+\% \text{ PAam.}$$

The invention claimed is:

1. A transparent composition comprising at least one impact modifier having a refractive index RI$_1$ dispersed in a polyamide matrix comprising a mixture of at least one amorphous polyamide and at least one semi-crystalline polyamide, said polyamide matrix having a refractive index RI$_2$, the difference in absolute value RI$_1$-RI$_2$ being less than or equal to 0.006,
    said transparent composition having a resistance in the notched Ross Flex fatigue test of greater than 50,000 at −10° C., wherein the Ross Flex test used is ASTM D1052 09(2014), the sample is notched, and the fold angle is 60°,
    wherein the transparent composition has a transparency such that the transmittance at 560 nm on a plate 2 mm thick is greater than or equal to 75% determined according to standard ISO 13468-2:2006,
    wherein said impact modifier represents from 17 to 27% of the total weight of the composition,
    wherein the transparent composition is free of polyether block amide (PEBA),
    wherein the impact modifier is a polymer having a flexural modulus less than 100 MPa measured according to the ISO 178 standard and Tg below 0° C. measured according to the standard 11357-2 near the inflection point of the DSC thermogram.

2. The transparent composition according to claim 1, wherein said transparent composition has a fatigue test resistance of greater than 100,000 at 23° C.

3. The transparent composition according to claim 1, wherein said matrix mixture comprises, by weight, the total being equal to 100%:
    55 to 75% by weight of at least one semi-crystalline polyamide wherein each semi-crystalline polyamide has a mean number of carbon atoms relative to the nitrogen atom greater than 9, said semi-crystalline polyamide having formula A/Z wherein,
        A is a repeating aliphatic unit chosen from a unit obtained from the polycondensation of at least one aminocarboxylic acid and a unit obtained from the polycondensation of at least one lactam or a unit X-Y obtained from the polycondensation:
            of at least one diamine, said diamine being selected from a linear or branched aliphatic diamine, and a cycloaliphatic diamine, and
            at least one dicarboxylic acid, said dicarboxylic acid being chosen from:
                an aliphatic diacid and a cycloaliphatic diacid, said diamine and said dicarboxylic acid comprising from 4 to 36 carbon atoms, and
        Z represents a repeating aliphatic unit as defined for A but different than A and is included at from 0 to 20% relative to the sum A+Z;
    25 to 45% by weight of an amorphous polyamide.

4. The transparent composition according to claim 3, wherein the proportion of Z=0.

5. The transparent composition according to claim 1, wherein said transparent composition further comprises from 0 to 5% of at least one additive selected from the group consisting of stabilizers, colorants, plasticizers, and whitening agents.

6. The transparent composition according to claim 1, wherein said transparent composition further comprises from 0 to 10% by weight of at least one fluidifying agent, wherein said fluidifying agent is a processing aid to aid in processing or demolding.

7. The transparent composition according to claim 1, wherein said transparent composition comprises, by weight, the total being equal to 100%:
    from 65 to 83% of said mixture of at least one amorphous polyamide and at least one semi-crystalline polyamide,
    from 17 to 27% of at least one impact modifier,
    optionally, from 0 to 5% of at least one additive selected from the group consisting of stabilizers, colorants, plasticizers, and whitening agents,
    optionally, from 0 to 10% by weight of at least one fluidifying agent, wherein said fluidifying agent is a processing aid to aid in processing or demolding,
    said amorphous polyamide being in sufficient proportion for the transparent composition to be sufficiently rubber at low temperature, and has an impact resistance with a T$_{RG}$<0° C. as determined according to standard ISO 179 1eA.

8. The transparent composition according to claim 1, wherein the transparent composition has a Haze less than or equal to 25% in Haze units, measured according to standard ASTM D1003-97.

9. The transparent composition according claim 1, wherein the semi-crystalline polyamide is an aliphatic polyamide.

10. The transparent composition according to claim 9, wherein the aliphatic semi-crystalline polyamide is selected from the group consisting of PA11, PA12, PA1010, and PA1012.

11. The transparent composition according to claim 10, wherein the aliphatic semi-crystalline polyamide is PA11 and the amorphous polyamide is 11/B10, B being bis-(3-methyl-4-aminocyclohexyl)-methane.

12. The transparent composition according to claim 1, wherein the amorphous polyamide is a polyamide having formula A$_1$/X$_1$Y$_1$ wherein:
    A$_1$ is a repeating aliphatic unit chosen from a unit obtained from the polycondensation of at least one aminocarboxylic acid and a unit obtained from the polycondensation of at least one lactam or a unit obtained from the polycondensation of at least one aliphatic diamine and at least one aliphatic diacid,
    X$_1$ is a cycloaliphatic diamine, and
    Y$_1$ is a dicarboxylic acid, said dicarboxylic acid being chosen from an aliphatic diacid, a cycloaliphatic diacid and an aromatic diacid,
    said diamine and said diacid described in A$_1$, X$_1$, and Y$_1$ comprising from 4 to 36 carbon atoms.

13. The transparent composition according to claim 12, wherein the amorphous polyamide is selected from the group consisting of 11/B10, 11/P10, 12/B10, 12/P10, 11/BI, 11/PI, 12/BI, and 12/PI, B being bis-(3-methyl-4-aminocyclohexyl)-methane and P being p-bis(aminocyclohexyl)-methane.

14. The transparent composition according to claim 1, wherein the impact modifier is chosen from styrene/ethylene-butene/styrene (SEBS) block copolymers.

15. The transparent composition according to claim 1, wherein the semi-crystalline polyamide and/or the amorphous polyamide is(are) partially or completely biosourced.

16. A transparent composition according to claim 1, comprising:
   from 73 to 83% by weight of a polyamide matrix having a refractive index $RI_2$,
   from 17 to 27% by weight of at least one impact modifier having a refractive index $RI_1$, said impact modifier not being PEBA,
   optionally, from 0 to 5% of at least one additive selected from the group consisting of stabilizers, colorants, plasticizers, and whitening agents,
   optionally, from 0 to 10% by weight of at least one fluidifying agent, wherein said fluidifying agent is a processing aid to aid in processing or demolding,
   the sum of the constituents being equal to 100% and the difference in absolute value $RI_1$-$RI_2$ being less than or equal to 0.006.

17. The transparent composition according to claim 16, wherein said polyamide matrix is a mixture comprising from 55 to 75% by weight of an aliphatic semi-crystalline polyamide and from 25 to 45% by weight of an amorphous polyamide.

18. The transparent composition according to claim 16, wherein the semi-crystalline polyamide is an aliphatic semi-crystalline polyamide selected from the group consisting of PA11, PA12, PA1010, and PA1012.

19. The transparent composition according to claim 18, wherein the aliphatic semi-crystalline polyamide is PA11 and the amorphous polyamide is 11/B10, B being bis-(3-methyl-4-aminocyclohexyl)-methane.

20. The transparent composition according to claim 16, wherein the amorphous polyamide is selected from the group consisting of 11/B10, 12/B10, 11/BI/BT, 11/BI, B being bis-(3-methyl-4-aminocyclohexyl)-methane.

21. The transparent composition as defined in claim 1, wherein said transparent composition is part of an article, wherein said article is selected from the group consisting of a sports article, eyewear, an electric and electronic article, a fiber, cloth, film, sheet, rod, tube, and an injected part, wherein said article is obtained by extrusion, injection, molding or thermoforming.

22. The transparent composition according to claim 21, wherein said article is obtained by injection, and wherein said article is selected from the group consisting of a sports article, a ski boot, a ski boot part, a rigid shoe with cleats, a part of rigid shoes with cleats, a soccer cleat, rugby cleat, football cleat, hockey footwear, a part of hockey footwear, a running shoe, a golf ball, a part of a golf ball, a lacrosse stick, a hockey article, a helmet, sport articles for protecting the head, shoulders, elbows, hands, knees, back or shins, helmets, gloves, shoulder pads, elbow pads, knee pads, shin guard, optical articles, goggles, a mask, protective goggles, and a ski mask.

23. The transparent composition as defined in claim 1, wherein said transparent composition is part of an article selected from the group consisting of, a part of a ski boot, a part of a roller boot, a part of hockey footwear, a ski boot, goggles, a mask, protective goggles, and a ski mask.

24. A method for forming an article from the transparent composition of claim 1, comprising a step of mixing said matrix, said impact modifier, optionally an additive and optionally a fluidifying agent, in a melt, in an extruder, at a temperature of between 230 and 330° C., to produce granules, said granules then injected at a temperature of between 230 and 330° C., on an injection press to produce the desired article, wherein said fluidifying agent is a processing aid to aid in processing or demolding, wherein said additive is selected from the group consisting of stabilizers, colorants, plasticizers, whitening agents, and mixtures thereof.

25. The transparent composition according to claim 1, wherein said amorphous polyamide has an impact resistance with a $T_{RG}$<0° C. as determined according to standard ISO 179 1eA.

* * * * *